June 19, 1962 P. C. CLARKE 3,039,318
SPRING COUNTERBALANCE DEVICE FOR RAISING
AND LOWERING A WEIGHT
Filed Oct. 28, 1959 2 Sheets-Sheet 1
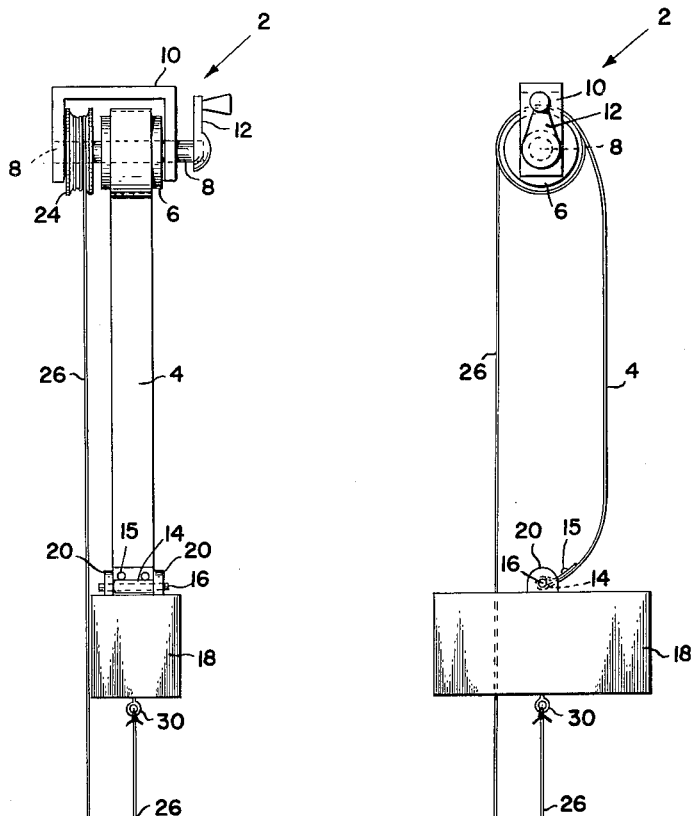
FIG. 1.
FIG. 2.
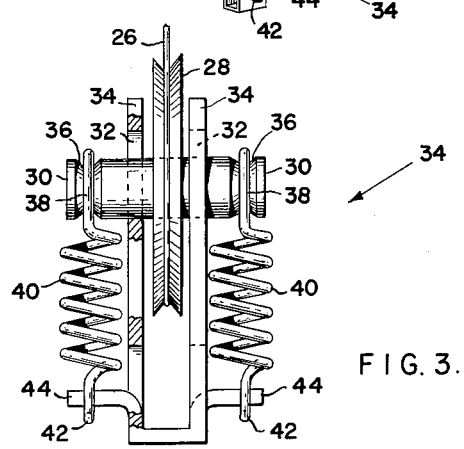
FIG. 3.
INVENTOR.
PHILIP C. CLARKE
BY
ATTORNEYS June 19, 1962 P. C. CLARKE 3,039,318
SPRING COUNTERBALANCE DEVICE FOR RAISING
AND LOWERING A WEIGHT
Filed Oct. 28, 1959 2 Sheets-Sheet 2

INVENTOR.
PHILIP C. CLARKE
BY
ATTORNEYS

United States Patent Office 3,039,318
Patented June 19, 1962

3,039,318
SPRING COUNTERBALANCE DEVICE FOR RAISING AND LOWERING A WEIGHT
Philip C. Clarke, Lansdale, Pa., assignor to Ametek, Inc., New York, N.Y., a corporation of Delaware
Filed Oct. 28, 1959, Ser. No. 849,278
8 Claims. (Cl. 74—95)

This invention relates to a spring counterbalance device for raising and lowering a weight. It is of utility, for example, in connection with a window.

A good example of the utility of the device of this invention is its employment in association with the window of an automobile. To provide a satisfactorily counterbalanced automobile window, there must not only be provided means for counterbalancing the weight of the window but in addition there must be provided means for raising and lowering the window in a positive manner in order to overcome the friction of the window slides which are normally felt lined and in order to provide for satisfactory operation in inclement and particularly icy weather. To meet these requirements within the confines of the limited amount of available space in an automobile door and at reasonable cost has posed a problem for which the automobile industry has long sought a solution. The adequacy with which the device of this invention solves this problem emphasizes the novelty of the invention.

The invention will be further clarified by a reading of the following description in conjunction with the drawings, in which—

FIGURE 1 is a front elevation of a counterbalancing device in accordance with this invention.

FIGURE 2 is a side elevation of the device of FIGURE 1.

FIGURE 3 is an enlarged view of the biased pulley guide in FIGURE 1.

Figure 4:
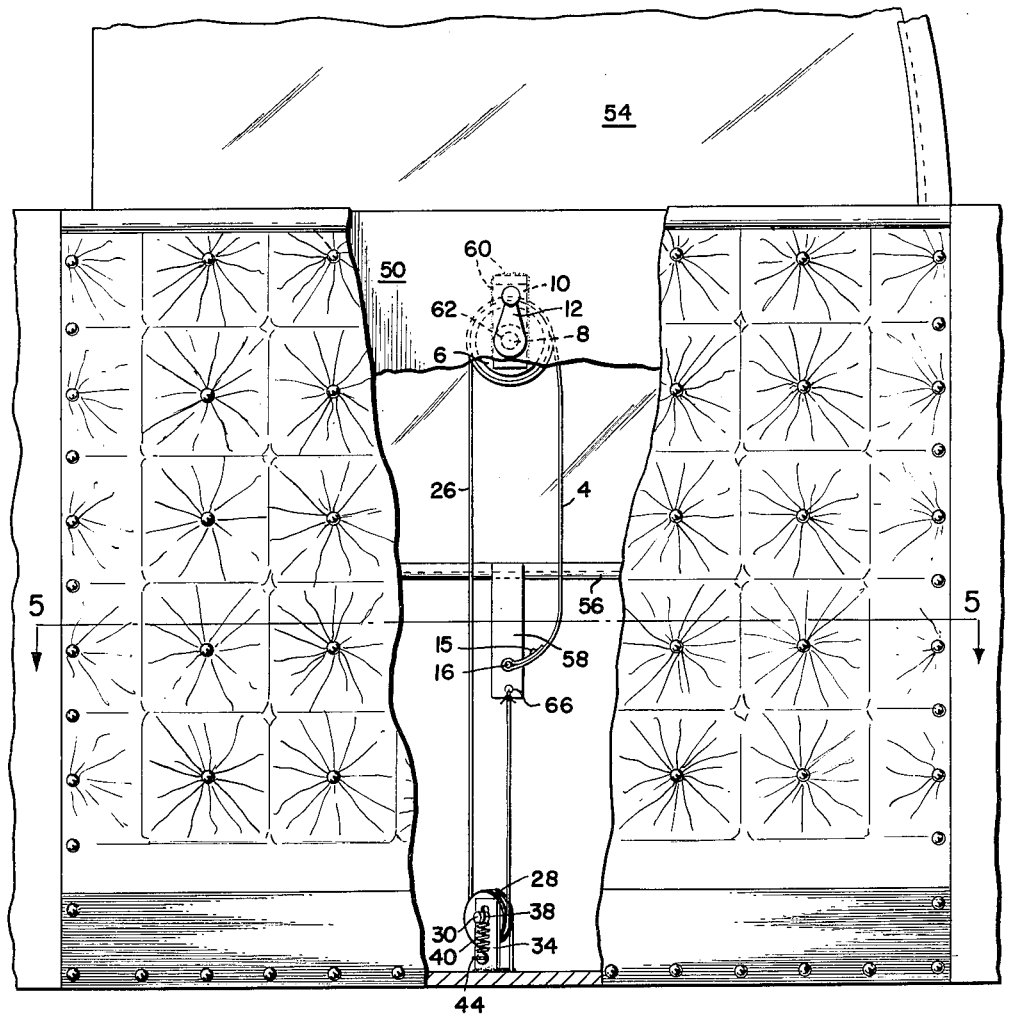
FIGURE 4 is a front elevation, partially broken away, showing the device of FIGURE 1 incorporated into a car door in association with a car window.
Figure 5:
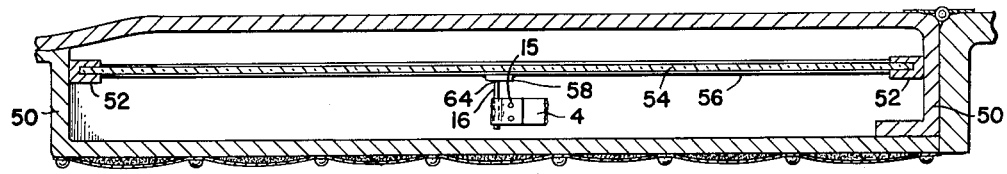
FIGURE 5 is a section taken on the plane indicated by the line 5—5, FIGURE 4.

Referring now to FIGURES 1 and 2, a counterbalancing device 2 in accordance with this invention has a normally tightly coiled ribbon spring 4 partially coiled on a drum 6. Such springs are also known as non-cumulative force spiral springs. Spring 4 advantageously will have a relatively low or zero gradient. Suitable springs are disclosed, for example, in Patent 2,609,191, issued September 2, 1952, and Patent 2,609,192, issued September 2, 1952. Substantially constant force springs such as are disclosed in Patent 2,609,191, give the best results. However, even a normally tightly coiled ribbon spring which has a substantial positive gradient as in the case of the spring disclosed in Patent 1,977,546, issued October 16, 1934, will give satisfactory results.

Drum 6 is fixedly secured to a shaft 8 which is mounted for rotation in a bracket 10. A crank handle 12 is secured to shaft 8 to provide for the rotation of the shaft and drum 6.

The free end of spring 4 is provided with a looped end 14 riveted at 15 which engages a pin 16. Pin 16 is secured to the upper surface of a weight 18 by brackets indicated at 20.

A second drum 24 is secured to shaft 8 adjacent to drum 6. A pull-down line 26 is partially coiled on drum 24 and passes downwardly around a pulley 28 and thence upwardly to be secured to a ring 30 attached to weight 18.

Pulley 28 is rotatably mounted on a shaft 30. Shaft 30 passes through guide slots 32, 32 in spaced upright plates 34, 34 lying on either side of pulley 28. Each end of shaft 30 is provided with a peripheral groove 36 which is engaged by a hook end 38 of an extension spring 40. Each extension spring 40 has a lower hook end 42 which engages an arm 44 of bracket 34. It will be noted that pulley 28 lies in a plane which intersects the vertical planes in which drums 6 and 24 lie in order to provide for a straight run for line 26 from pulley 8 to both drum 24 and weight 18.

The force exerted by spring 4 will be selected to exactly or substantially counterbalance weight 18.

*Operation*

In operation crank handle 12 will be turned counterclockwise as viewed in FIGURE 2 in order to raise weight 18. If the force exerted by spring 4 exactly counterbalances weight 18 then the only work required to raise weight 18 will be the overcoming of the friction in the counterbalancing device which will obviously be very small.

As weight 18 is moved upwardly by the coiling of spring 4 on drum 6, drum 24 is unwinding line 26 in order that this line will not inhibit the lifting of weight 18. Springs 40 act to take up any slight slack that may occur in line 26, since they are initially tensioned by line 26.

When, on the other hand, it is desired to lower weight 18, handle 12 is turned in the clockwise direction as viewed in FIGURE 2 which permits spring 4 to uncoil from drum 6. At the same time, weight 18 is positively moved downwardly by virtue of the winding up of line 26 on drum 24 which results in the shortening of line 26 between weight 18 and pulley 28.

It will be appreciated that in describing the invention with reference to a weight, the term "weight" is intended to connote any structure which is desirably counterbalanced.

The device of FIGURE 1 is shown incorporated into an automobile car window in FIGURE 4. As shown in FIGURE 4, the shell 50 of a car door mounts opposed felt lined window guide tracks 52, 52. A window 54 having a frame member along its lower edge indicated at 56 is slidably mounted in guide tracks 52, 52. A bar 58 depends from frame 56.

The device of FIGURE 1 is incorporated within panel 50 to operate the window assembly described above. Bracket 10 is secured to the interior of panel 10 as indicated at 60 and shaft 8 passes through an opening 62 in panel 50. Pin 16 which is engaged by the lower end of spring 4 is secured to bar 58 at 64 as by welding.

Line 26 is secured through an opening 66 in the lower end of bar 58 as by tying. Bracket 34 for the mounting of pulley 28 is secured to the bottom of shell 50 as by welding.

It is believed that the operation of window 54 by the counterbalancing device 2 will be fully apparent from the previous description of the operation of this device.

It is not desired to be limited except as set forth in the following claims.

What is claimed is:

1. A counterbalancing device for raising and lowering a weight comprising drum means adapted to be mounted for rotation, a normally tightly coiled ribbon spring partially coiled on said drum means, means to connect the free end of said spring to the weight to counterbalance the weight, a pull-down line partially coiled on said drum means, guide means for said line adapted to be mounted below the drum means, said line being adapted to extend downwardly from the drum means, around the guide means and upwardly to be secured to the weight and means to rotate said drum means to effect the raising and lowering of the weight by coiling the spring and uncoiling the pull-down line and coiling the pull-down line and uncoiling the spring, respectively.

2. A counterbalancing device for raising and lowering a weight comprising drum means adapted to be mounted for rotation, a normally tightly coiled ribbon spring partially coiled on said drum means, means to connect the free end of said spring to the weight to counterbalance the weight, a pull-down line partially coiled on said drum means, guide means for said line adapted to be mounted below the drum means, said line being adapted to extend downwardly from the drum means, around the guide means and upwardly to be secured to the weight, means to rotate said drum means to effect the raising and lowering of the weight by coiling the spring and uncoiling the pull-down line and coiling the pull-down line and uncoiling the spring, respectively and resilient means adapted to bias said guide means downwardly to take up slack in said line.

3. A counterbalancing device for raising and lowering a weight comprising a drum adapted to be mounted for rotation, a normally tightly coiled driven spring partially coiled on said drum, means to connect the free end of said spring to the weight, a second drum adapted to be mounted adjacent said first mentioned drum, a pull-down line partially coiled on said second drum, guide means for said line adapted to be mounted below the weight, said line being adapted to extend downwardly from the second drum around the guide means and upwardly to be secured to the weight and means to rotate said drums simultaneously to effect the raising and lowering of the weight by coiling the spring and uncoiling the pull-down line and coiling the pull-down line and uncoiling the spring, respectively.

4. A counterbalancing device for raising and lowering a weight comprising a drum adapted to be mounted for rotation, a normally tightly coiled ribbon spring partially coiled on said drum, means to connect the free end of said spring to the weight, a second drum adapted to be mounted adjacent said first mentioned drum, a pull-down line partially coiled on said second drum, guide means for said line adapted to be mounted below the weight, said line being adapted to extend downwardly from the second drum around the guide means and upwardly to be secured to the weight, means to rotate said drums simultaneously to effect the raising and lowering of the weight by coiling the spring and uncoiling the pull-down line and coiling the pull-down line and uncoiling the spring, respectively and resilient means adapted to bias said guide means downwardly to take up slack in the pull-down line.

5. The combination comprising a weight adapted to be raised and lowered, drum means mounted for rotation adjacent said weight, a normally tightly coiled ribbon spring partially coiled on said drum means, means connecting the free end of said spring to the weight to counterbalance the weight, a pull-down line partially coiled on said drum means, guide means for said line mounted below the drum means, said line extending downwardly from the drum means around the guide means and upwardly to be secured to the weight, means to rotate said drum means to effect the raising and lowering of the weight by coiling the spring and uncoiling the pull-down line and coiling the pull-down line and uncoiling the spring, respectively.

6. The combination comprising a weight adapted to be raised and lowered, drum means mounted for rotation adjacent said weight, a normally tightly coiled ribbon spring partially coiled on said drum means, means connecting the free end of said spring to the weight to counterbalance the weight, a pull-down line partially coiled on said drum means, guide means for said line mounted below the drum means, said line extending downwardly from the drum lines around the guide means and upwardly to be secured to the weight, means to rotate said drum means to effect the raising and lowering of the weight by coiling the spring and uncoiling the pull-down line and coiling the pull-down line and uncoiling the spring, respectively and resilient means biasing said guide means downwardly to take up slack in the pull-down line.

7. The combination comprising a weight adapted to be raised and lowered, a drum mounted for rotation adjacent the weight, a normally tightly coiled ribbon spring partially coiled on said drum and having its free end extending downwardly and secured to said weight to counterbalance the weight, a second drum adapted to be mounted adjacent said first mentioned drum, a pull-down line partially coiled on said second drum, guide means for said line mounted below said second drum, said line extending downwardly from the second drum, around the guide means and upwardly to be secured to the weight and means to rotate said drums simultaneously to effect the raising and lowering of the weight by coiling the spring and uncoiling the pull-down line and coiling the pull-down line and uncoiling the spring, respectively.

8. The combination comprising a weight adapted to be raised and lowered, a drum mounted for rotation adjacent the weight, a normally tightly coiled ribbon spring partially coiled on said drum and having its free end extending downwardly and secured to said weight to counterbalance the weight, a second drum adapted to be mounted adjacent said first mentioned drum, a pull-down line partially coiled on said second drum, guide means for said line mounted below said second drum, said line extending downwardly from the second drum, around the guide means and upwardly to be secured to the weight, means to rotate said drums simultaneously to effect the raising and lowering of the weight by coiling the spring and uncoiling the pull-down line and coiling the pull-down line and uncoiling the spring, respectively and resilient means biasing said guide means downwardly to take up slack in the pull-down line.

References Cited in the file of this patent

UNITED STATES PATENTS

| | | |
|---|---|---|
| 981,286 | Lanning | Jan. 10, 1911 |
| 1,299,701 | Gilman et al. | Apr. 8, 1919 |
| 1,607,080 | Hodson | Nov. 16, 1926 |
| 1,832,870 | Markgren | Nov. 24, 1931 |
| 2,609,191 | Foster | Sept. 2, 1952 |
| 2,609,193 | Foster | Sept. 2, 1952 |

FOREIGN PATENTS

| | | |
|---|---|---|
| 593,487 | France | Aug. 24, 1925 |
| 736,994 | Germany | May 27, 1943 |